United States Patent [19]
Grange

[11] Patent Number: 5,425,686
[45] Date of Patent: Jun. 20, 1995

[54] TRANSMISSION CONTROL MODULE RESPONSIVE TO STEERING-WHEEL-MOUNTED SWITCHES FOR CHANGING BETWEEN AN AUTO, SEMI-AUTO AND MANUAL MODES

[75] Inventor: Jean-Paul Grange, Illkirch Graffenstaden, France

[73] Assignee: General Motors Corporation, Detroit, Mich.

[21] Appl. No.: 158,181

[22] Filed: Nov. 26, 199342568623100274335

[51] Int. Cl.⁶ .................. F16H 59/08; F16H 59/12
[52] U.S. Cl. ................................. 477/79; 74/335; 74/473 SW; 74/483 PB
[58] Field of Search ....... 74/473 R, 483 SW, 473 PB, 74/335; 364/424.1; 200/61.54, 61.56; 477/79, 81

[56] References Cited

U.S. PATENT DOCUMENTS

| | | | |
|---|---|---|---|
| 1,524,923 | 2/1925 | Forsythe | 74/483 PB |
| 4,537,088 | 8/1985 | Kubota | 74/473 SW |
| 4,631,679 | 12/1986 | Klatt | 364/424.1 |
| 4,697,092 | 9/1987 | Roggendorf et al. | 200/61.54 X |
| 4,790,204 | 12/1988 | Tury et al. | 74/483 PB |
| 4,884,057 | 11/1989 | Leorat | 74/483 PB X |
| 4,930,366 | 6/1990 | Boucher et al. | 200/61.54 X |
| 4,993,278 | 2/1991 | Nakanishi | 74/473 SW X |
| 5,009,128 | 4/1991 | Seidel et al. | 74/335 |
| 5,035,158 | 7/1991 | Leigh-Marstevens | 74/866 |
| 5,043,892 | 8/1991 | Brekkestran et al. | 74/866 X |
| 5,063,511 | 11/1991 | Mack et al. | 74/866 X |
| 5,099,720 | 3/1992 | Raue | 74/866 |
| 5,120,914 | 6/1992 | Kerner et al. | 200/61.54 |
| 5,156,243 | 10/1992 | Aoki et al. | 74/335 X |

FOREIGN PATENT DOCUMENTS

| | | | |
|---|---|---|---|
| 1212557 | 1/1984 | Canada | 74/335 |
| 0036571A1 | 9/1981 | European Pat. Off. | B23K 7/04 |
| 0121167A1 | 10/1984 | European Pat. Off. | F16H 5/74 |
| 0250333A1 | 2/1987 | European Pat. Off. | B60K 20/16 |
| 0353331A1 | 2/1990 | European Pat. Off. | G07C 5/10 |
| 0444250 | 9/1991 | European Pat. Off. | |
| 3237509A1 | 4/1984 | Germany . | |
| 3337930A1 | 7/1984 | Germany . | |
| 3726336 | 2/1989 | Germany . | |
| 3735184 | 5/1989 | Germany . | |
| 3832971 | 4/1990 | Germany . | |
| 391613A1 | 12/1990 | Germany . | |
| 3924318 | 1/1991 | Germany . | |
| 3925064 | 1/1991 | Germany . | |
| 3941665A1 | 6/1991 | Germany | B60K 20/06 |
| 2228980 | 9/1990 | United Kingdom . | |

OTHER PUBLICATIONS

"Car and Driver", Oct. 1994, p. 37, "Porsche Tiptronic Does It F1 Style" by Peter Robinson.

Quattroruote, 1989; "Ferrari Control McLaren:duello al vertice", pp. 244–245.

Autocar & Motor, May 1990; "Porsche Carrera 2 Tiptronic", pp. 27–31.

SAE Technical Paper Series, Sep. 1990; "Porsche Carrera 2 Tiptronic Transmission: (901760)", J. Petersmann, W. Seidel, and W. Mollers, pp. 11–24.

Road and Track, Apr. 1990, p. 77. "F1 Engines: Looking Back, Looking Forward".

Primary Examiner—Charles A. Marmor
Assistant Examiner—Khoi Q. Ta
Attorney, Agent, or Firm—Vincent A. Cichosz

[57] ABSTRACT

The transmission control module of an automatic transmission includes a shift control module adapted to command a gear or gear range increment or decrement in dependence upon the switching of an enable switch and of an upshift switch and a downshift switch, the switches being provided on the vehicle steering wheel. The performance of the engine can thereby be controlled by the driver. The transmission control module can also be operated in an automatic mode, a semiautomatic mode and a manual mode in dependence upon the mode selected by selecting means.

3 Claims, 3 Drawing Sheets

TRANSMISSION CONTROL MODULE RESPONSIVE TO STEERING-WHEEL-MOUNTED SWITCHES FOR CHANGING BETWEEN AN AUTO, SEMI-AUTO AND MANUAL MODES

This is a continuation of application Ser. No. 07/896248 filed on Jun. 10, 1992 now abandoned.

The present invention relates to a transmission control module for a vehicle comprising means operable by a vehicle driver to carry out a gear or gear range increment or decrement.

Existing automatic transmissions are controlled by a transmission control module, often of electronic type, which selects the appropriate gear from a plurality of gears in dependence upon vehicle operating parameters, which normally include vehicle speed and throttle position. The transmission generally includes a gear lever movable by the driver between a plurality of gear ranges, which for a four gear transmission conventionally includes Reverse, Drive, Third, Second and First (R, D, 3, 2, 1).

In Drive, the transmission control module determines which of the four forward gears is appropriate for the engine operating conditions and selects that gear. In Third, the fourth forward gear is disabled so that the highest gear available to the transmission is third. In Second, the forth and third gears are disabled; while in First, only the first gear is available for use by the transmission.

Disabling the higher gears is useful in situations such as in mountains and the like to prevent one of the higher gears from being selected.

However, this arrangement is not convenient in situations where high acceleration is constantly required, for example during cornering and the like. Furthermore, when changing gear range, it is necessary for the driver first to find the position of the gear lever, and then to move the gear lever, which is time consuming and requires the driver to look down to the gear lever, thereby temporarily losing sight of the road.

EP-A-365,715 discloses a system in which the gear lever can be moved in one of two shifting lanes, the first providing the conventional functions, and the second allowing the gear lever to be moved forwardly or backwardly to cause the transmission to carry out a gear increment or decrement from the then engaged gear.

Although this allows for the possibility of faster acceleration than with the conventional automatic transmission, it is necessary for the gear lever to be disconnected from its original function, that is from its position in the main shifting lane, moved to the second lane, and then moved forwardly or backwardly as necessary. As will be appreciated, there is the possibility that by the time this is done, it may no longer be necessary to change gear.

Similarly, if the gear lever is in the second shifting lane, it can take a significant time to move it to the desired position in the first shifting lane.

SUMMARY OF THE PRESENT INVENTION

The present invention is directed to an improved automatic transmission control module for controlling the operation of a transmission of a vehicle in dependence upon vehicle operating conditions, comprising shift control means including manually operable actuating means adapted to be fitted to the vehicle steering wheel or steering column, the shift control means being adapted to cause the transmission control module to carry out a gear increment or decrement on actuation of the manually operable actuating means.

According to another aspect of the present invention, there is provided a transmission control module for controlling the operation of a transmission of a vehicle in dependence upon vehicle operating conditions, comprising determining means adapted to determine the range of gears available for use by the transmission control module, and shift control means including manually operable actuating means adapted to be fitted to the vehicle steering wheel or steering column, the shift control means being adapted to cause the determining means to increment or decrement the range of available gears on actuation of the manually operable actuating means.

With these arrangements, it is not necessary to move the gear lever physically, where it is provided, before carrying out the desired gear or gear range increment or decrement, which can therefore be rapid. Furthermore, by having the actuating means fitted to the vehicle steering wheel or steering column, it is not necessary for the driver to release the steering wheel to increment or decrement gears or gear ranges.

The separation of the gear or gear range increment and decrement facility from the remainder of the transmission control module makes it possible to place the actuating means on the steering wheel or steering column, which is not possible with other arrangements due to their complexity.

This arrangement can be used with the gear lever of a conventional automatic transmission, making its incorporation into existing vehicles possible.

The manually operable actuating means comprises at least one shifting switch operable in predetermined manner in dependence upon the action to be taken by the shift control means. Appropriate control could be provided by coded actuation of a single switch, for example a certain number of depressions of the switch representing a particular command.

Preferably, the manually operable actuating means comprises at least two shifting switches operable in predetermined manner in dependence upon the action to be taken by the shift control means. One of the shifting switches may be operable to effect a gear or gear range increment, and the other shifting switch operable to effect a gear or gear range decrement. This would make the system more driver friendly by avoiding the necessity to have coded switching or the like. The two shifting switches could be located at opposite sides of the steering wheel for use by a respective hand of the driver.

In an embodiment, the manually operable actuating means comprises an enabling switch adapted to be actuated to allow operation of the shifting switches. Use of an enabling switch would avoid the possibility of actuating a gear shift by inadvertent actuation of one of the switches. Alternatively, the system could be arranged such that it responds only to a particular actuation of the shifting switches, for example only to a double depression of one of the switches.

Each switch of the manually operable actuating means is preferably connected to the transmission control module through a resistance network adapted to cause each switch to produce an individual identifying voltage to the transmission control module on actuation thereof. Advantageously, the switch or switches of the manually operable actuating means are connected to the transmission control module through a common electrical wire. With this arrangement, it is not necessary to have many wires between the steering wheel and the transmission control module.

In cases where a horn actuator is fitted to the vehicle steering wheel or steering column, the manually operated actuating means is preferably connected to the transmission control module through the electrical wire of the horn. This saves the need to have any separate wires for the actuating means, and makes it a simple task to incorporate the gear or gear range changing facility in an existing vehicle.

According to another aspect of the present invention, there is provided a transmission control module for controlling the operation of a transmission of a vehicle in dependence upon vehicle operating conditions, comprising selecting means for selecting between an automatic mode, a semi-automatic mode and a manual mode, and processing means adapted to control the transmission in a manner determined by the mode selected by the selecting means.

The term steering wheel, as used herein, is intended to include any other suitable form of vehicle steering device, such as a steering stick.

DETAILED DESCRIPTION OF THE INVENTION

Figure 1:
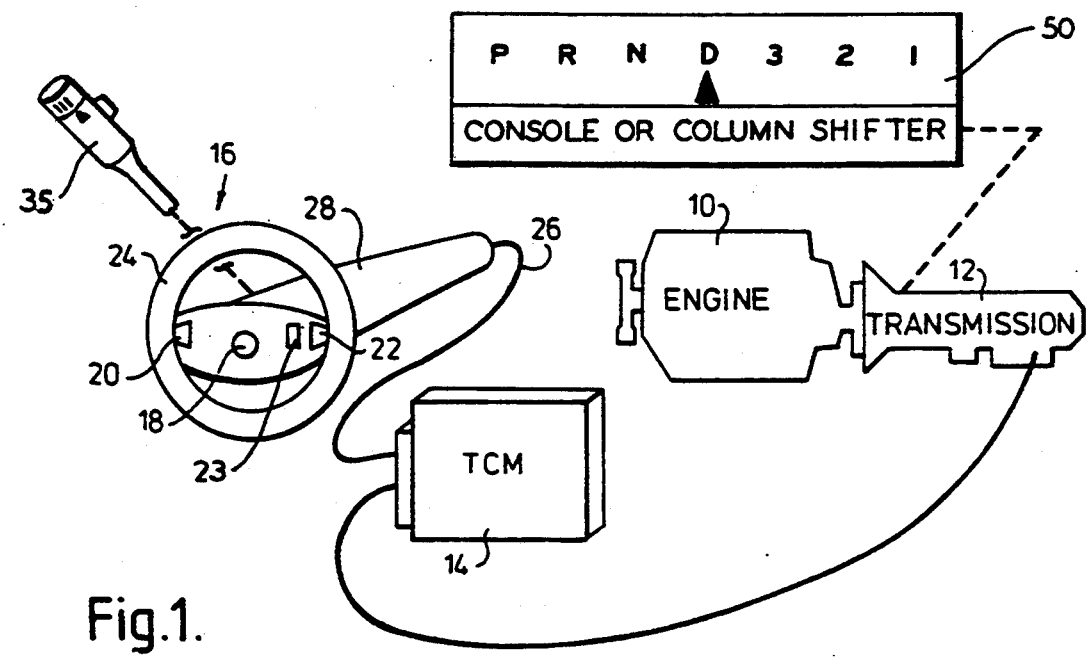
FIG. 1 shows an embodiment of a transmission control module connected to a transmission.

Referring to FIG. 1, the output shaft of a vehicle engine 10 is shown connected to an automatic transmission unit 12. A transmission control module (TCM) 14, of computerized type, is connected to the transmission unit 12 and is responsible for controlling the selection of the gears in dependence upon detected engine operating conditions, which may include vehicle speed and throttle position/engine load. This aspect of the transmission control module 14 is well known in the art so will not be described further here.

The transmission control module 14 also includes algorithms to ensure that the engine 10 is never run in such a manner that it can be damaged, for example if the engine speed is made to exceed a maximum level, as will become apparent below in connection with FIGS. 3 and 4. It may also include facilities to enable the engine to be run in an "economy" mode to reduce consumption, or in a "sport" mode to increase performance, as is known in the art.

Forming part of the transmission control module 14 is a shift control module 16 which in this embodiment comprises three push-button switches 18, 20, 22 fitted to the vehicle steering wheel 24. Outputs of the switches 18, 20, 22 are connected to the transmission control module 14 through an output line 26 passing through the steering column 28.

Also shown in FIG. 1 is a steering column stick 35 which provides at least conventional directional indications.

A first switch 18, located at the center of the steering wheel 24, is an enabling switch which enables operation of the other two switches.

The other two switches 20,22 are located diametrically opposite one another on the steering wheel 24 and are shifting switches, one being a gear increment, or upshift switch 20 and the other being a gear decrement, or downshift switch 22. Of course, the position of the upshift and downshift switches could be reversed, or other suitable arrangement used.

Also shown in FIG. 1, is a conventional automatic transmission gear lever 50 which is movable in a shifting lane between Park, Reverse, Neutral, and the gear ranges Drive, Third, Second and First, as is well known in the art. Gear lever 50 may take the form of any conventional steering column or center console gear lever as is well known in the art.

Figure 2:
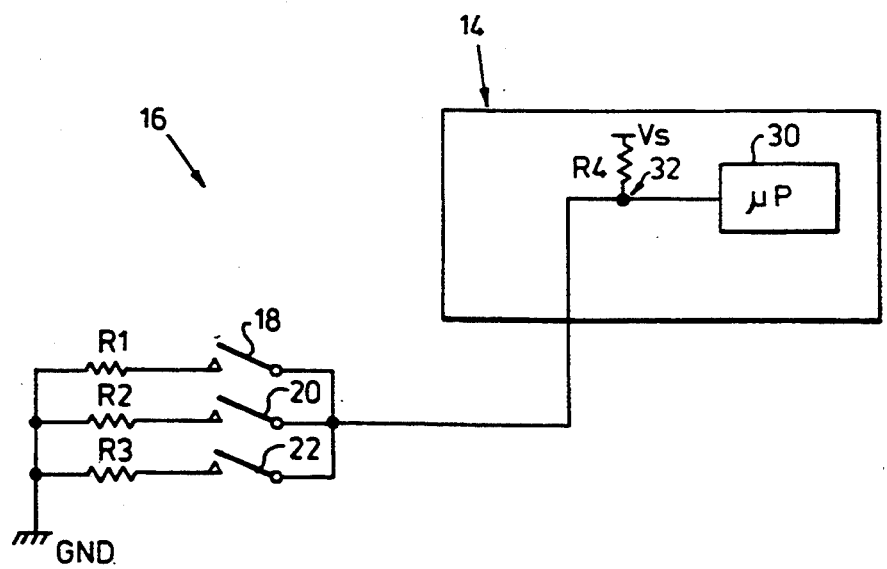
FIG. 2 shows an embodiment of a shift control means forming part of the transmission control module of FIG. 1.

FIG. 2 shows an example of circuitry for the shift control module 16 for use in controlling the transmission control module 14. Each of the switches 18, 20, 22 is connected at one terminal to a respective resistance R1, R2, R3, and at the other terminal to an input of the microprocessor 30 of the transmission control module 14 via a pull-up resistor R4.

The other terminal of each of the resistors R1, R2, R3 is connected to ground; while the other terminal of the pull-up resistor R4 is connected to a voltage source $V_s$, which may be a reference voltage source already supplied by the transmission control module 14 for other purposes (such as for sensors and the like).

Each of the resistors R1, R2, R3 has an individual value which is chosen such that, when the respective switch is closed, one of three distinct voltages appears at node 32 between the relevant resistor R1, R2, R3 and the resistor R4.

Node 32 is connected to an input of the microprocessor 30 through an analog-to-digital converter (not shown), or alternatively through a series of voltage comparators, to provide the microprocessor 30 with an indication of the voltage at node 32, and thereby an indication of which switch 18, 20, 22 is closed.

This arrangement allows for a single wire connecting the switches 18, 20, 22 to the transmission control module 14, thereby making it simple to fit to the vehicle steering wheel.

Although shown as being a separate connection, the ground terminal GND to which the second terminals of the resistors R1, R2, R3 are connected, may be coupled directly to the ground of the transmission control module 14 to avoid any problems of having a floating ground.

In cases where a horn switch (not shown) is provided on the steering wheel, the switches 18, 20, 22 may be connected to the transmission control module 14 through the wire of the horn switch, saving the need to have an additional wire passing through the steering column. Operation of the system could be the same as if a separate connection were provided, as long as the voltage produced on closing of the horn switch (for activation of the horn) is different to those produced by the switches 18, 20, 22, to distinguish between closure of the horn switch and depression of the switches 18, 20, 22. Use of the horn wire is particularly advantageous when fitting the system to an existing vehicle.

As will be apparent to the skilled person, a possible way of monitoring the state of the shift control circuit of FIG. 2 is to have the microprocessor 30 check the voltage at node 32 at regular intervals, such as once every cycle of its control program, for which a sample and hold circuit may be provided. The description of the operation of the system will be based on this implementation.

A second possibility is to have the shift control module 16 access an interrupt input to the microprocessor 30 to cause an interrupt when a suitable voltage at node 32 is detected. For example, an interrupt could be produced only when the voltage at node 32 is representative of the enabling switch 18 having been depressed. An interrupt routine could then be carried out to check the voltage at node 32 so as to determine which shifting switch 20, 22 is then depressed.

Any other suitable arrangement could, of course, be used.

The operation of the shift control module 16 of FIG. 1 will be described with reference to the embodiment of the circuit shown in FIG. 2.

The shift control module 16 only becomes operative when the gear lever (50) of the automatic transmission 12 is placed in the Drive position. This prevents the gear lever and the shift control unit from making conflicting requests to the transmission control module 14. For example, it prevents the shift control module 16 from requesting a gear shift when the gear lever is in the Park position.

When the gear lever is in the Drive position, monitoring of the voltage at node 32 is enabled. As long as none of the switches 18, 20, 22 is depressed, the voltage at node 32 remains high, thereby allowing the transmission control module 14 to continue in the normal Drive mode.

On depression of the enabling switch 18 by the driver, the voltage at node 32 changes to the value produced by the voltage divider R4, R1, which is digitized by the analog-to-digital converter (not shown). The microprocessor interprets the new voltage value as a request to enable upshifting or downshifting upon the subsequent depression of one of the shifting switches 20, 22.

If the upshift switch 20 is then depressed, the voltage at node 32 changes to the value given by voltage divider R4, R2, thereby producing the individual analog voltage at node 32 and digitized voltage value at the output of the analog-to-digital converter. This causes suitable determining means in the transmission control module 14 to determine which gear is engaged and to determine therefrom which new gear has been requested by activation of the upshift switch 20.

If it is possible to carry out a gear increment, that is if the transmission is not already in the top gear (in this case the fourth gear) and, where such a test is provided, it is determined that the upshift would not cause the engine speed to drop below a predetermined level, the transmission control module 14 carries out an upshift routine to increment a gear in accordance with the request. For example, if second gear is engaged when a valid request is made, the transmission control module 14 causes third gear to be engaged.

By depressing the upshift switch 20 additional times, the gears can be incremented further until the highest gear is reached or, where such a test is provided, the engine speed would drop to below an acceptable level.

If an upshift request is not allowed by the transmission control module 14, an indication is given to the driver, in the form of a message on a display or an acoustic signal, or in any other suitable form.

On depression of the downshift switch 22, the voltage at node 32 changes to the value given by potential divider R4, R3, thereby producing the individual digital value at the output of the analog-to-digital converter for switch 22, indicating that a downshift from the engaged gear is desired and causing the determining means to determine which gear is engaged and which new gear has been requested.

If it is possible to decrement a gear, that is the lowest gear is not already engaged and, where such a test is provided, it is determined that the engine speed for the new desired gear would not exceed a predetermined maximum level, a downshift is carried out.

On a further depression of the downshift switch 22, the transmission control module 14 decrements a further gear if such a decrement is allowed.

As with the upshift routine described above, if a downshift request is not allowed, an indication is given to the driver.

In the above manner, the driver can manually override the automatic transmission and, if desired, change up and down gears by appropriate depression of the switches 18, 20, 22.

The requirement that the enabling switch 18 is depressed each time it is desired to depress one of the shifting switches 20, 22 ensures that inadvertent depression of the shifting switches 20, 22 does not produce a gear change.

When additional security is required, the upshift and downshift routines are only enabled if the appropriate shifting switch 20, 22 is depressed within a predetermined time of depression of the enabling switch 18, with timing commencing again each time a shifting switch 20, 22 is validly depressed or whenever the enabling switch 18 is depressed. Of course, any other suitable arrangement may be used.

Furthermore, if after being enabled by the enabling switch 18, the microprocessor 30 receives an erroneous voltage, for example due to the simultaneous depression of two of the switches 18, 20, 22, the microprocessor 30 may take some form of remedial action, such as setting the gear range to Fourth (Drive), or to leave the semi-automatic mode, or to take no action in the manual mode.

As will be apparent from the above, with this embodiment of the invention, it is not necessary for the driver to know what gear is engaged at the time a request for a gear shift is made, so that any such request can be made in dependence upon the actual requirements the driver has of the engine.

In an alternative embodiment, the shift control module 16 acts to replace the gear lever range selection function once the enabling switch 18 has been depressed.

Thus, in this alternative embodiment, a downshift, if allowed, decrements the then active gear range by one. For example, if the gear range active at the time of a valid decrement request is the Drive mode, this is decremented to the Third mode, and so forth. The operation is similar to that of moving the gear lever to one of the other positions provided, although it will be appreciated this will not actually involve the movement of the gear lever itself.

Similarly, by depression of the upshift switch 20, the active gear range can be incremented, for example, from First to Second, and then to Third and finally to Drive in dependence upon the number of depressions of the upshift switch 20, assuming, of course, that the requests are allowed.

As with the first-described embodiment, the transmission control module 14 will include means for determining the range of gears available for use by the transmission control module 14 and to determine therefrom the new range of gears which has been requested by the actuation of one of the switches 20, 22. For example, when the range of available gears is First, Second and Third and the downshift switch 22 is depressed, the determining means will determine at the time the request is made that the range of available gears is the first three forward gears and that, on acceptance of the request, the range will be reduced to the First and Second gears only.

In either of the above described embodiments, the shift control module 16 is immediately disabled if the gear lever is moved from the Drive position to any other position. Thus, if the gear lever is moved to the Neutral or Park position, for example, the shift control module 16 is disabled to prevent the transmission control module 14 from receiving conflicting commands.

The features of the above two embodiments can be combined together to enable the transmission to be operated selectively in a manual or a semi-automatic mode or in a conventional automatic mode. In order to allow this facility, a switch 23 shown in FIG. 1, is provided at a suitable location in the vehicle, such as on the steering wheel 24, to switch the transmission control module 14 into either a manual mode or a semi-automatic mode.

Figure 3:
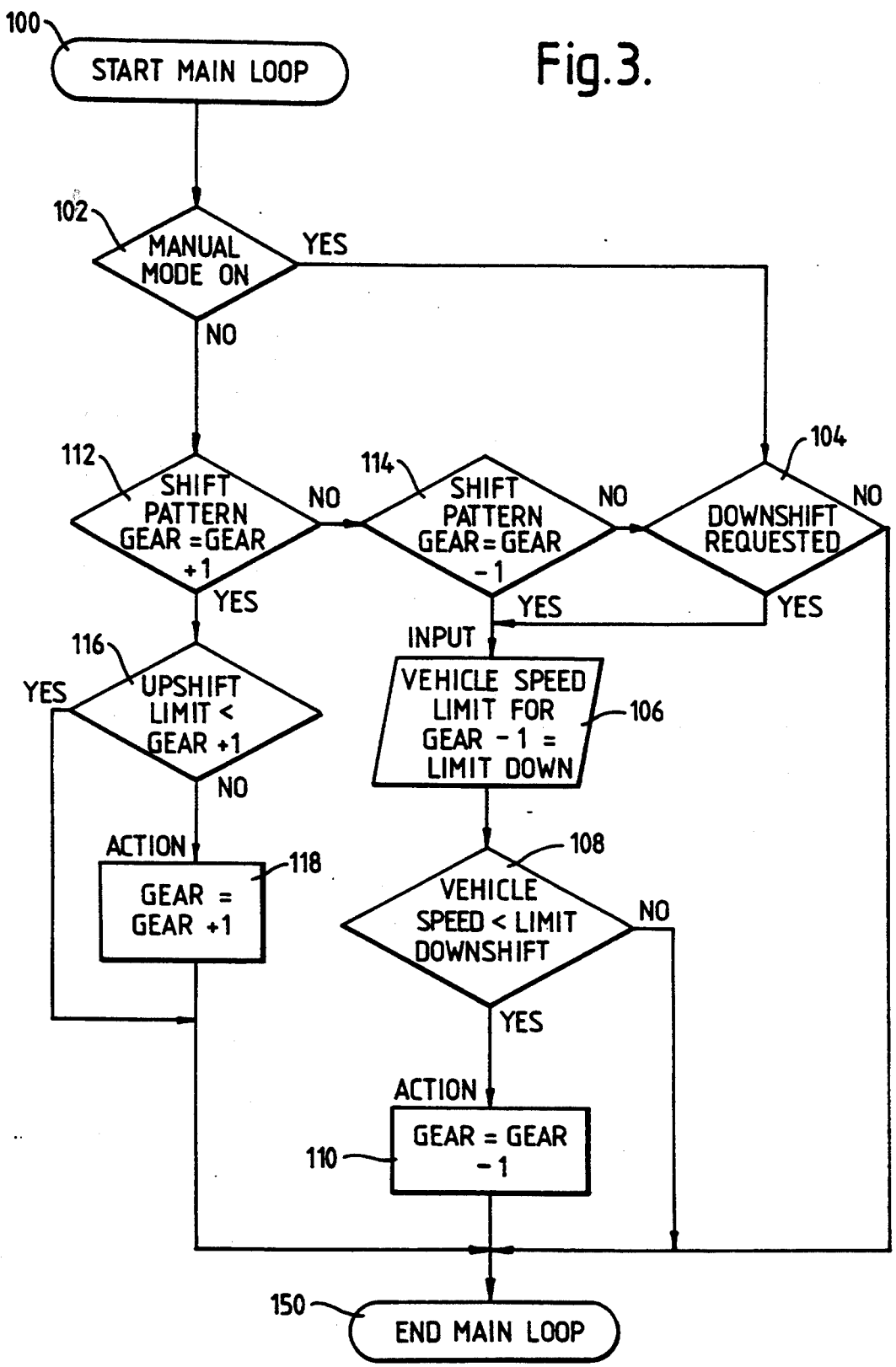
FIG. 3 is a flow chart of an embodiment of a routine for use in the transmission control module of FIG. 1.
Figure 4:
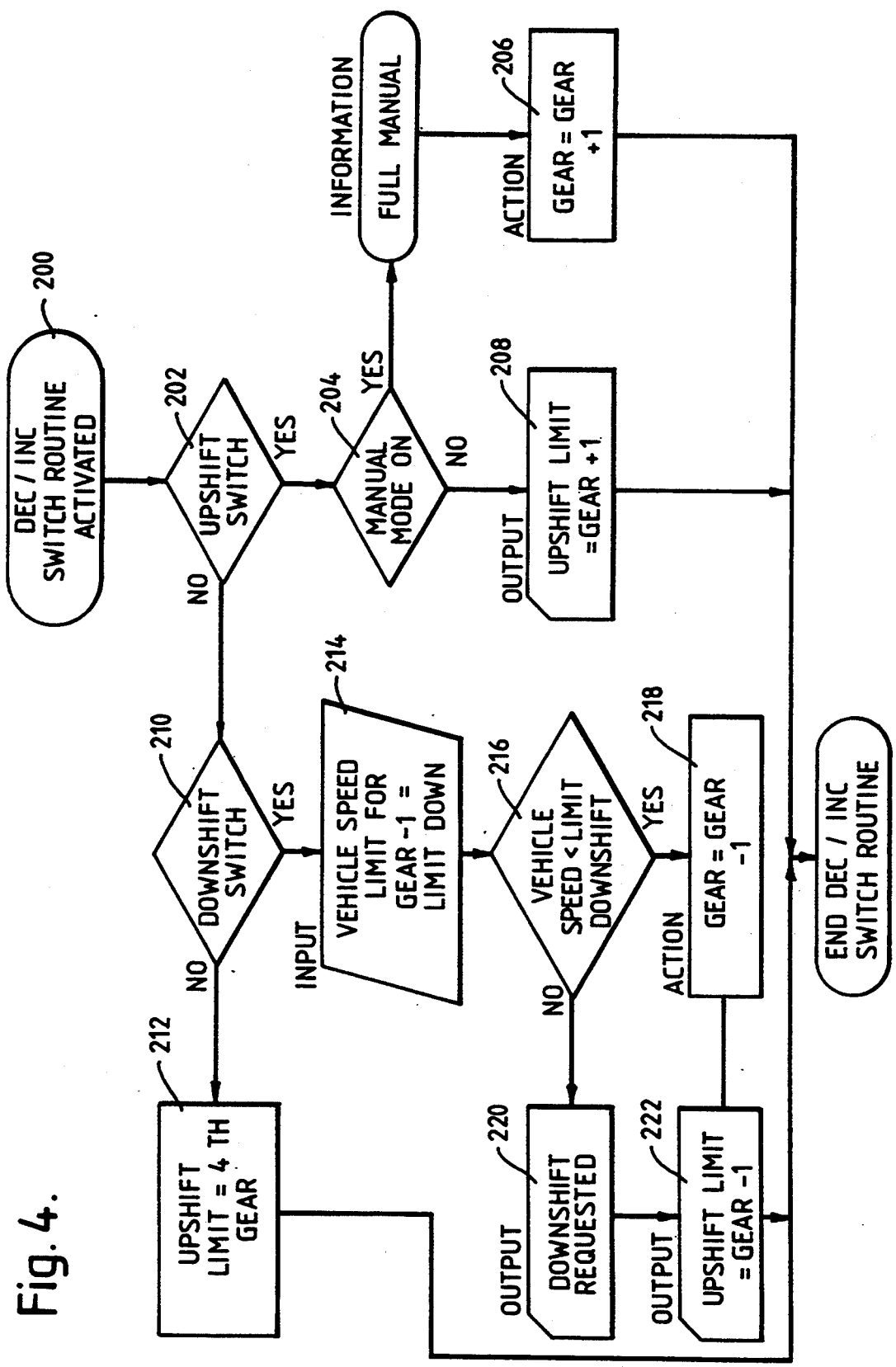
FIG. 4 is a flow chart of an embodiment of an increment/decrement routine for use in the transmission control module of FIG. 1.

An example of routines which provide such a facility are shown in FIGS. 3 and 4.

Referring first to FIG. 3, the transmission control module 14 periodically repeats a main routine 100 which is responsible for carrying out automatic control of the transmission together with downshifts in the manual mode.

The routine 100 starts at step 102 at which it is determined whether an automatic/manual switch is set in the manual position. If this is the case, the routine passes to step 104 to determine whether a downshift has been requested. If no such request has been made, the routine is left at step 150. However, if a downshift has been requested, then the routine passes to steps 106 to 110 to determine whether the request can be met. At step 106, the routine obtains from memory a LIMIT DOWN value for the requested gear, representative of the maximum allowable vehicle speed in the requested lower gear. At step 108 the actual vehicle speed is measured and compared to the LIMIT DOWN value, and if the vehicle speed is not less than this value the routine is left at step 150. On the other hand, if the measured vehicle speed is less than the LIMIT DOWN value, the routine passes to step 110 at which a gear downshift is carried out.

If it is determined that a downshift should not be made, a note of the request is stored in memory for use in subsequent passes though the routine 100 so as to repeat steps 106 and 108 until the downshift is effected.

Returning to step 102, if the transmission is not in the manual mode, the routine passes to step 112 at which the vehicle speed is measured and compared to a transmission shift pattern map (of conventional type) stored in memory to determine whether a gear increment is required. If the determination at step 112 is negative, the routine passes to step 114 to determine whether the shift pattern map indicates that there should be a gear decrement. If this is negative, the routine is left via step 104; however, if step 114 indicates that there should be a gear decrement, the routine passes through steps 106 and 108 to step 110 to carry out the required gear decrement. Of course, the values in the shift pattern map will be appropriate for the LIMIT DOWN value so that step 110 can be performed.

If it is determined at step 112 that the shift pattern map indicates that a gear increment is appropriate, the routine passes to step 116 to determine whether the selected gear range would allow such an increment. For example, an upshift from third to fourth would not be available if the selected transmission range is Third.

If it is possible to carry out a gear increment, then the routine passes to step 118 to effect the increment, otherwise, the routine is left.

Referring now to FIG. 4, when the increment/decrement facility is activated, such as by depression of the enable switch 18, the transmission control module 14 performs the routine 200. This routine is also carried out when the transmission has been set into the manual mode and a gear increment has been requested.

The first step in the routine 200 is step 202 at which it is determined whether an upshift has been requested, such as by depression of the upshift switch 20. If such a request has been made, the routine passes to step 204 to determine if the transmission has been set to the manual mode, in which case the routine passes to step 206 to carry out the gear increment immediately. If the transmission has not been set into the manual mode, the routine passes to step 208 to increment the upshift limit, for example from the gear range Third to the gear range Drive.

On the other hand, if step 202 determines that an upshift has not been requested, the routine passes to step 210 to determine whether a downshift has been requested, such as by depression of the downshift switch 22. In this embodiment, when a downshift request is accepted, both the engaged gear and the gear range are decremented. This ensures that a downshift in gears is effected to provide an increase in acceleration.

If no downshift request has been made, the routine passes to step 212 at which the gear range limit is set to fourth gear, that is to Drive, or to any previously set gear range (set, for example, by a previous actuation of one of the upshift or downshift switches 20,22).

On the other hand, if step 210 determines that a downshift has been requested, the routine passes to step 214 to determine which gear is engaged and to obtain on the basis of the engaged gear a LIMIT DOWN value representative of the highest allowable vehicle speed for the requested gear. For example, if the transmission is in third gear when the downshift request is made, step 212 finds the maximum vehicle speed allowable in second gear.

The actual vehicle speed is measured at step 216 and compared to the LIMIT DOWN value, and if the speed is less than LIMIT DOWN, the routine passes to step 218 to carry out the requested gear downshift.

However, if the vehicle speed is not less than the LIMIT DOWN value, the routine passes to step 220 at which a note is made that a downshift has been requested, such as by setting a flag in a suitable register. This note is then used in subsequent passes through the routine 200 so as to repeat steps 214 and 216 until the downshift is made.

At step 222, the routine decrements the transmission upshift limit by a gear, in other words carries out a gear range decrement. If it was determined at step 216 that a gear downshift was not allowable and the transmission was then in the highest allowable gear in the active gear range, a gear range downshift is not performed until the vehicle speed satisfies the requirements in a subsequent pass through the routine. However, step 222 will nevertheless prevent any upshift from the engaged gear.

As will be apparent from FIGS. 3 and 4, it is possible to provide a system having a conventional automatic transmission with a manual transmission facility and an increment/decrement facility.

In an alternative implementation, a steering column stick 35 is adapted to provide the functions of, and in substitution for push-button switches 18,20,22 shown in FIG. 1. This stick could be used in a similar way to the indicator stick on a vehicle, with the shifting switches positioned at the two ends of travel of the stick and the enable switch located in such a manner that a deliberate movement of the stick is required to cause it to be actuated.

By simple modification of the circuit, which will be apparent to the skilled person, the transmission control module 14 could be made to respond to simultaneous actuation of the enable switch 18 and one of the shifting switches 20,22.

Of course, it is not necessary to have an enable switch 18. This could be omitted completely, or be replaced by some form of coding for the other two switches 20,22, such as a requirement to depress one of the switches 20,22 twice before a command is interpreted as having been intended.

Furthermore, a display may be provided for indicating information such as which gear and/or gear range is engaged, which gear and/or gear range has been requested, and whether or not such a request has been accepted.

Modification to the above embodiments for use with a continuously variable transmission, or other type of transmission, will be apparent to the skilled person.

The embodiments of the invention in which an exclusive property or privilege is claimed are defined as follows:

1. A transmission control system for controlling the operation of a transmission of a vehicle in dependence upon vehicle operating conditions, said system comprising:

selecting means comprising shift control means including manually operable actuating means fitted to a vehicle steering apparatus for selecting between an automatic mode, a semi-automatic mode and a manual mode; and, a transmission control module responsive to actuation of the manually operable actuating means to command a gear change in said manual mode and a range change in said semi-automatic mode.

2. A transmission control system as claimed in claim 1 wherein the transmission control module is responsive to actuation of the manually operable actuating means to command a gear downshift when said actuating means is actuated to decrement the range of gears available.

3. A transmission control system as claimed in claim 1 wherein the transmission control module is responsive to actuation of the manually operable actuating means to command a gear upshift when said actuating means is actuated to increment the range of gears available.

* * * * *

UNITED STATES PATENT AND TRADEMARK OFFICE
CERTIFICATE OF CORRECTION

PATENT NO. :   5,425,686
DATED      :   June 20, 1995
INVENTOR(S) :  Jean-Paul Grange It is certified that error appears in the above-identified patent and that said Letters Patent is hereby corrected as shown below:

On the title page, item [22] of the patent shows the "Filed" date as "Filed:    Nov. 26, 1993425686623100274335".

Please correct this date to read:
--Filed:    Nov. 26, 1993--.

Signed and Sealed this

Twenty-second Day of August, 1995

Attest:

Attesting Officer

BRUCE LEHMAN

Commissioner of Patents and Trademarks